Patented June 14, 1949

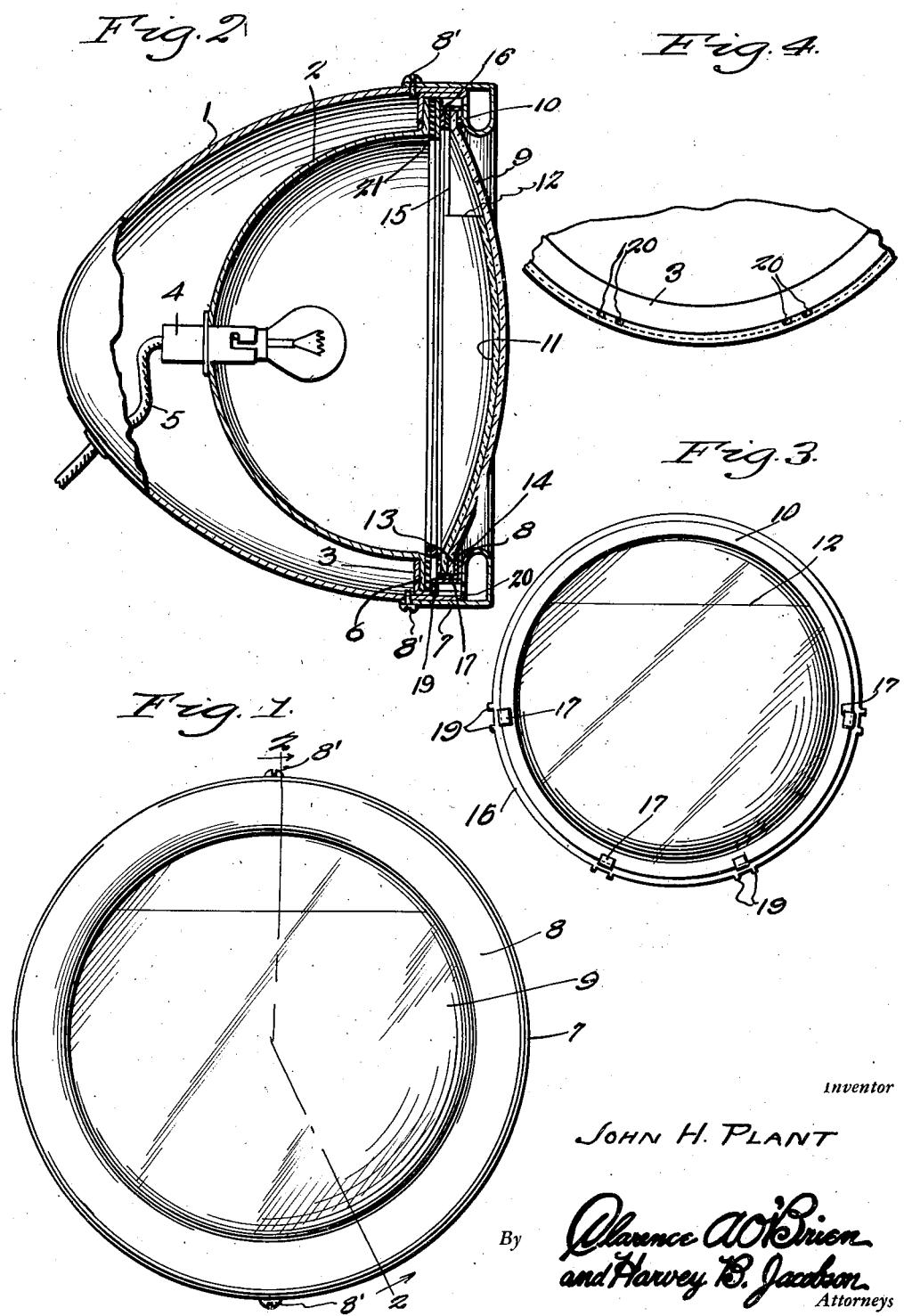

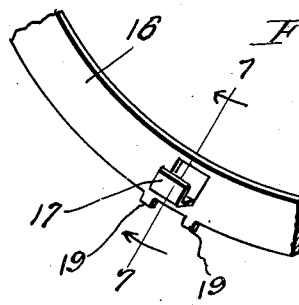
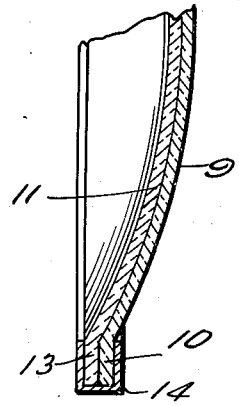
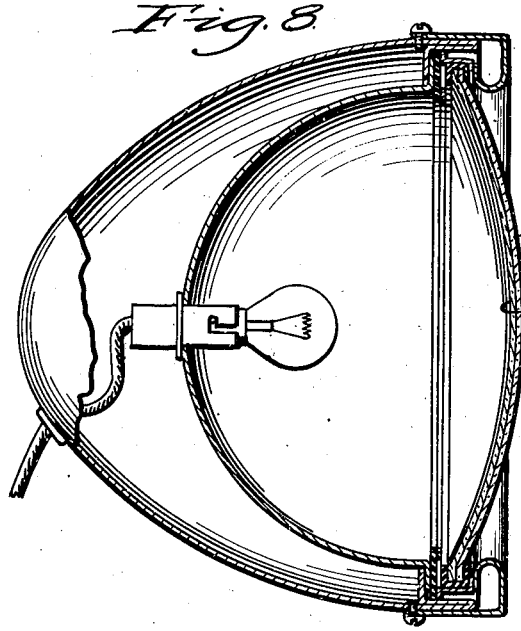
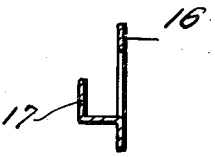
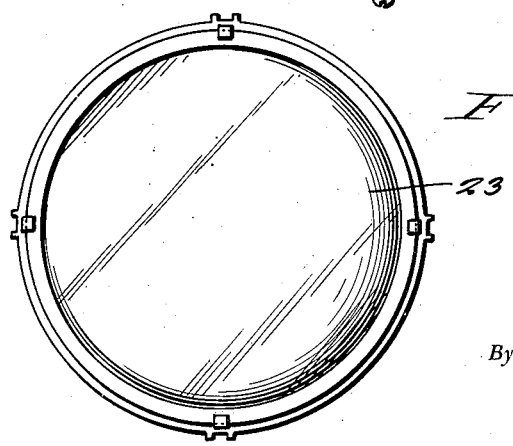

2,472,850

UNITED STATES PATENT OFFICE 2,472,850

ANTIGLARE LENS STRUCTURE FOR HEADLIGHTS AND THE LIKE

John H. Plant, Aurora, Ill.

Application July 14, 1945, Serial No. 605,087

3 Claims. (Cl. 240—46.59)

My invention relates to improvements in antiglare lens structures for automobile headlights, especially, although not necessarily, since, as will presently appear, the invention may be practiced in connection with various other forms of lights.

The primary object of the invention is to provide for such lights an anti-glare lens structure which is of simple form and inexpensive construction and adapted to obviate glare tending to blind or confuse oncoming drivers, or pedestrians, on the road, and which will render dimming of headlights unnecessary while at the same time providing for adequate road illumination.

Other and subordinate objects, also comprehended by my invention, together with the precise nature of my improvements, and the manifold advantages thereof, will become apparent when the succeeding description and claims are read with reference to the drawings accompanying and forming part of this specification.

In said drawings:

Figure 1 is a view in front elevation of my improved anti-glare lens structure, in a preferred embodiment thereof, applied to an automobile headlight, Figure 2 is a view in vertical longitudinal section taken on the line 2—2 of Figure 1, Figure 3 is a view in front elevation of the lens structure detached and drawn to a reduced scale, Figure 4 is a fragmentary view in front elevation of the headlight casing, Figure 5 is a fragmentary view in section of the lenses and the binder ring therefor drawn to an enlarged scale, Figure 6 is a fragmentary view in perspective of the keeper ring for the lenses, also drawn to an enlarged scale, Figure 7 is a detail view in transverse section taken on the line 7—7 of Figure 6, Figure 8 is a view in vertical longitudinal section illustrating a modification of the invention, Figure 9 is a view in front elevation of the lens structure of the modification of the invention detached and drawn to a reduced scale.

Reference being had to the drawings by numerals, and first to Figures 1 to 7 thereof, my invention has been shown therein, in a preferred embodiment thereof, as forming part of the equipment of a well known type of automobile headlights of commerce, including the usual casing 1, containing a reflector 2 of hemi-spherical form substantially, with a lateral, external, annular flange 3 at the front thereof, and an electric light carrying socket 4 in the axis of the reflector and rear part thereof fixed therein with leads 5 extending therefrom out of the casing 1. The casing 1 is provided at the front thereof with the usual internal centering and clamping annulus 6 of right angled form in cross section in which the flange 3 fits and seats rearwardly, the annulus 6 being shown as formed integrally with the casing 1 in this instance. The usual lens locking ring 7 fitting over the front of the casing 1 and secured thereto by screws 8' embodies an internal right angled front edge flange 8 opposed to the flange 3 in spaced-apart relation, as shown.

According to the preferred embodiment of my invention, a circular front lens 9 is provided for the described headlight and which is formed of clear glass and of concavo-convex shape with the exception of a plane surrounding edge 10. Fitted in the lens 9 is a rear lens 11 of similar shape comprising substantially three-quarters of a circle with a horizontal top chordal edge 12 from which a plane edge 13 similar to the edge 10 extends around the lens. The lens 11 is formed of a colored glass, preferably amber, adapting the same to filter out some of the light rays, both direct and projected, emanating from the reflector 2 so as to eliminate glare. The edges 10, 13 of the lenses 9, 11 are clamped together in concentric relation by means of a channeled binder ring 14, preferably of rubber, an arcuate filler strip 15 being interposed between the edge 12 of the lens 11 and the binder ring 14 and fitting in said ring, as shown in Figure 2.

A keeper ring 16 is provided for the lenses 9, 11 and which is of flat form and any suitable metal with forwardly projecting right angled lugs 17 suitably spaced around the same below the horizontal center of the ring and in which the binder ring 14 is frictionally fitted. The keeper ring 16 is provided with pairs of circumferentially spaced edge ears 19, which pairs are spaced circumferentially of the ring 16 in correspondence with the lugs 17 and fit in pairs of internal cross grooves 20 provided in the annulus 6. The keeper ring 16 is retained in the annulus 6 by the flange 8 of said ring 7 between which and an annular gasket 21 said keeper ring 16 is interposed, the gasket 21 bearing against the flange 3 of the reflector 2 whereby said reflector is retained in the annulus 6 by the keeper ring 16.

The manner in which the invention as so far described is designed to operate will be readily understood. Below the edge 12 of the rear lens 11, the light rays are filtered by said lens 11 in a manner to cut down glare to a minimum, and, in effect, eliminate glare, whereas above said edge 12 the light rays are projected through the front lens 9 downwardly and forwardly to provide for road illumination. In this connection, it is to be noted that the light carrying socket 4 is arranged so that the light is positioned in the axis of the reflector a distance greater than half the radius from the rear of the reflector so that light rays are reflected forwardly and downwardly by the upper portion of the reflector 2 above the edge 12 of the lens 11. The front lens 9 protects the rear lens 11, thereby maintaining the same clean. By removing the locking ring 7, both lenses 9, 11, together with the keeper ring 16, may be easily and quickly detached from the casing 1 and thereby provide for access to the interior of the reflector 2, as occasion may require, and also for removal of said reflector 2 and the gasket 13, as will be seen, the described lens structure renders the use of dimmers unnecessary.

In the modification of the invention shown in Figures 8 and 9, the construction and arrangement is the same as that previously described with reference to the preferred embodiment of the invention, with the exception that the rear lens 22 is circular and of the same size as the front lens 23. The front lens 23, in this instance, functions as a protector for the rear lens 22. Such a lens structure is particularly adapted for use in flood lights on landing fields, headlights for airplanes, and marine and locomotive lights.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. In a headlight comprising a casing, a lens structure comprising a front-circular lens of clear transparent material, and a rear lens of colored transparent material opposed flat against the front lens, a channeled binder ring in which the edges of the lenses are frictionally fitted, and means to secure said structure in said casing comprising a keeper ring having forwardly projecting right angled lugs in which the binder ring is fitted and provided with edge pairs of ears interlocked with said casing against play crosswise of the same.

2. In a headlight comprising a casing, a lens structure comprising a front-circular lens of clear transparent material, and a rear lens of colored transparent material opposed flat against the front lens, a channeled binder ring in which the edges of the lenses are frictionally fitted, and means to secure said structure in said casing comprising a keeper ring having forwardly projecting right angled lugs in which the binder ring is fitted and provided with edge pairs of ears interlocked with said casing against play crosswise of the same, said rear lens terminating between the horizontal center and top of the front lens in a straight horizontal edge.

3. In a headlight comprising a casing, a lens structure comprising a front-circular lens of clear transparent material, and a rear lens of colored transparent material opposed flat against the front lens, a channeled binder ring in which the edges of the lenses are frictionally fitted, and means to secure said structure in said casing comprising a keeper ring having forwardly projecting right angled lugs in which the binder ring is fitted and provided with edge pairs of ears interlocked with said casing against play crosswise of the same, said front lens being circular in form and said rear lens comprising substantially three-quarters of a circle and terminating in a horizontal top straight edge.

JOHN H. PLANT.

REFERENCES CITED

The following references are of record in the file of this patent:

UNITED STATES PATENTS

| Number | Name | Date |
|---|---|---|
| 1,166,244 | Norton | Dec. 28, 1915 |
| 1,222,427 | Lewellen et al. | Apr. 10, 1917 |
| 1,433,731 | Kubat | Oct. 31, 1922 |
| 1,471,395 | Garwood | Oct. 23, 1923 |
| 1,755,298 | Hotchkin | Apr. 22, 1930 |

FOREIGN PATENTS

| Number | Country | Date |
|---|---|---|
| 558,100 | France | 1923 |